Aug. 21, 1945.　　　A. Y. DODGE　　　2,383,295
CLUTCH
Filed Nov. 5, 1942　　　2 Sheets-Sheet 1

Inventor:
Adiel Y. Dodge,
By Dawson, Ooms & Booth
Attorneys.

Aug. 21, 1945.  A. Y. DODGE  2,383,295
CLUTCH
Filed Nov. 5, 1942   2 Sheets-Sheet 2
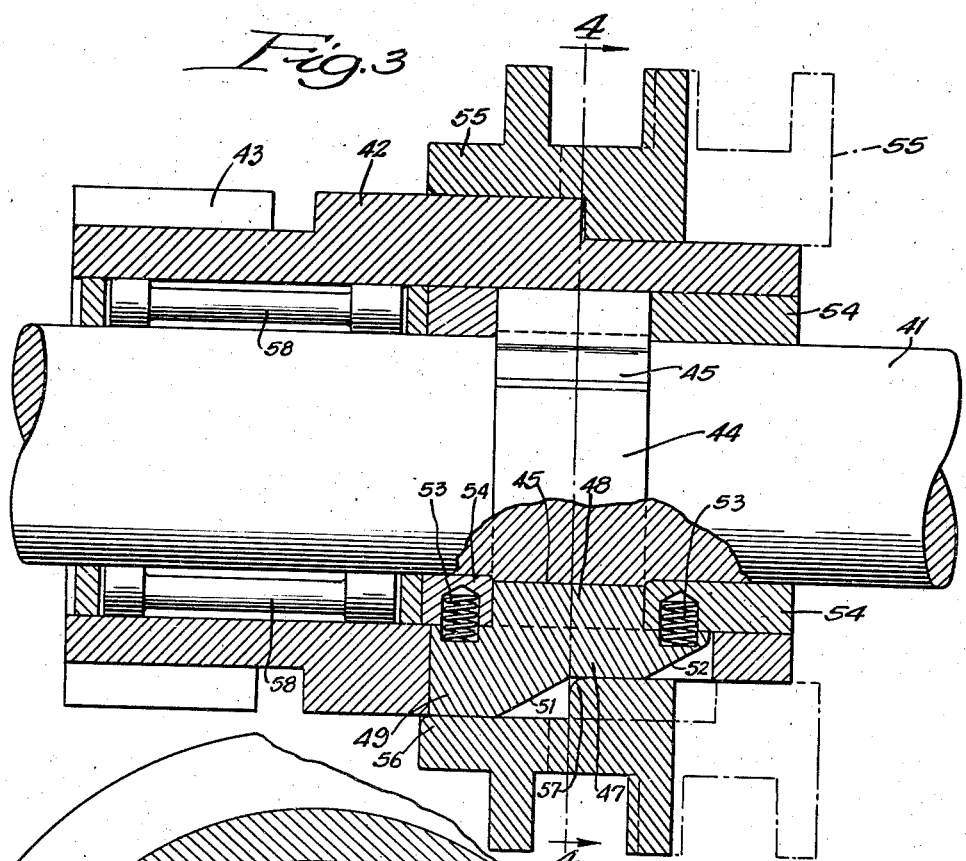
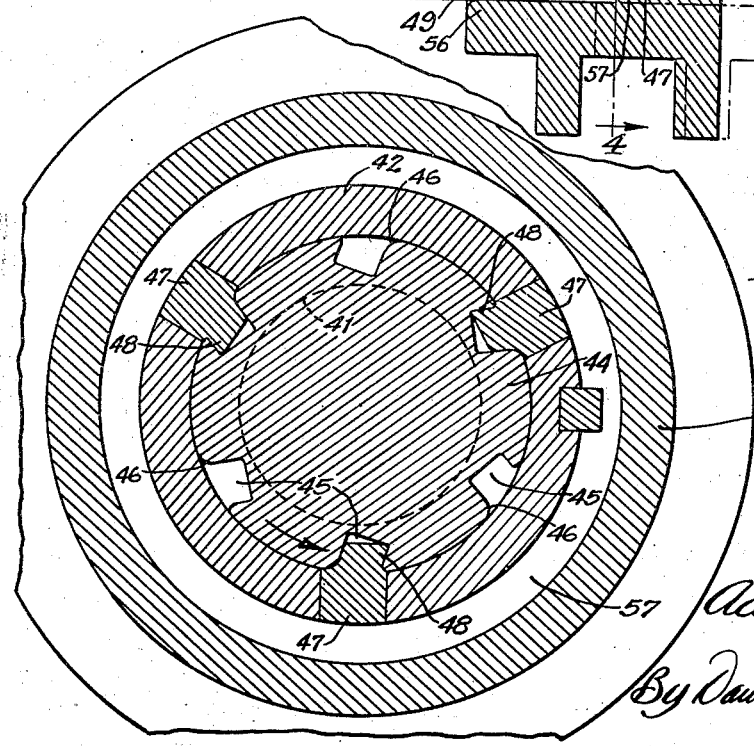
Inventor.
Adiel Y. Dodge.
By Dawson, Orwig & Booth,
Attorneys.

Patented Aug. 21, 1945

2,383,295

UNITED STATES PATENT OFFICE 2,383,295

CLUTCH

Adiel Y. Dodge, Rockford, Ill.

Application November 5, 1942, Serial No. 464,591

18 Claims. (Cl. 192—47)

This invention relates to clutches and more particularly to controllable clutches for establishing a driving connection between two parts at will.

One of the objects of the invention is to provide a clutch which can be engaged only when rotation of the parts is synchronized.

Another object of the invention is to provide a clutch of the positive or semi-positive type which can be disengaged even though it is under torque load.

Still another object of the invention is to provide a clutch in which over-running of the parts is prevented.

This feature may be utilized to obtain synchronization to facilitate engagement of the clutch.

A further object of the invention is to provide a clutch which can be simply and positively controlled both for engagement and for disengagement.

Still another object of the invention is to provide a clutch which is simple and compact in construction and is, at the same time, highly efficient and flexible in operation.

The above and other objects of the invention will be more readily apparent from the following description when read in connection with the accompanying drawings, in which—

Figure 3 is an axial section of another clutch embodying the invention; and

Figure 4 is a section on the line 4—4 of Figure 3.

Figure 1:
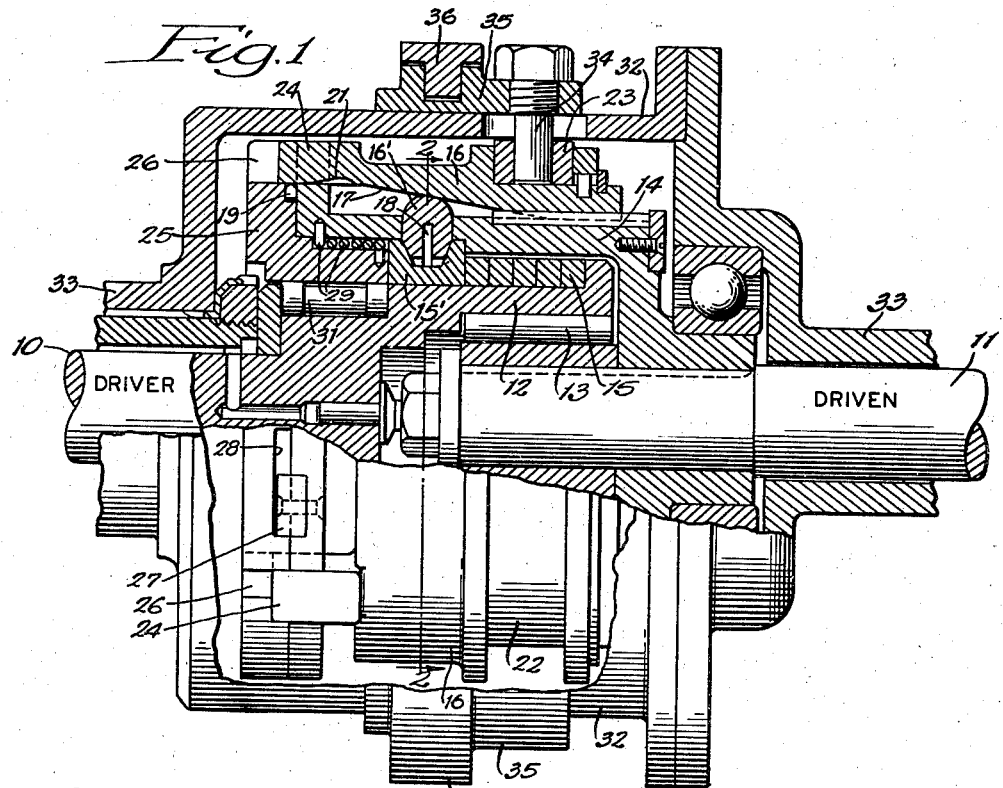
Figure 1 is a side elevation with parts in section of a clutch embodying the invention.
Figure 2:
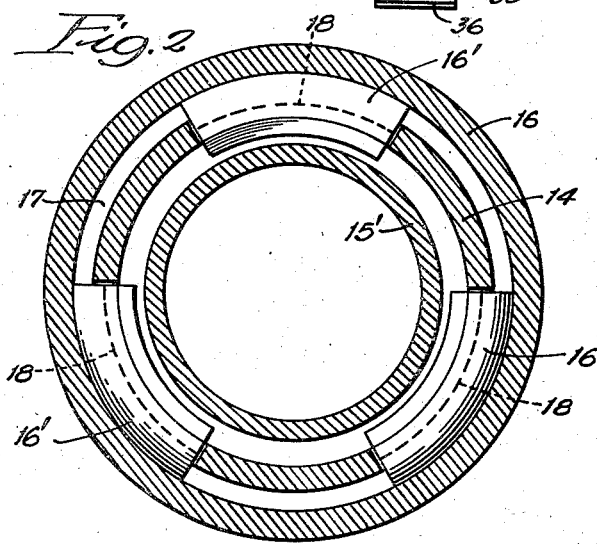
Figure 2 is a partial section on the line 2—2 of Figure 1.

The clutch of Figures 1 and 2 is intended to connect a driving shaft 10 to a driven shaft 11, the two shafts being coaxial. The driving shaft 10 is formed with a tubular extension 12 supported on the driven shaft by bearings 13 and the driven shaft carries a similar tubular extension 14 coaxial with and spaced from the extension 12. The extension 12 carries connecting means shown as formed by a helical coil 15 anchored at its right end to the extension 12 and wrapped tightly therearound. The opposite end of the coil is anchored to a ring 15' which is otherwise rotatably supported on the extension 12.

The extension 14 on the driven shaft is formed with a series of spaced openings or slots in which brake members 16' are slidably supported for radial movement into frictional engagement with ring 15'. As shown, three such brake members are provided but it will be apparent that more or less could be used if desired.

The brake members 16' are controlled by a control collar 16 slidably keyed or splined to the extension 14 and having an inner cam surface 17 engaging the brake members to move them radially in when the collar is shifted to the left.

It will be noted that the brake members 16' are formed with slots 18 therein so that they may yield to facilitate adjustment of the collar so that the means for shifting it may not be subjected to load when it is in a position to engage the brake means. To hold the collar in such position, a spring detent 19 is provided cooperating with a groove 21 in the collar tending to hold the collar shifted to the left as seen in Figure 1.

The collar 16 is formed with an annular groove 22 receiving a yoke 23 through which it may be shifted either manually or by any desired automatic means.

In order to prevent shifting of the collar except when the driving and driven members are synchronized, blocking means are provided shown as comprising one or more axially extending fingers 24 on the collar. The fingers cooperate with a blocking ring 25 rotatably carried by the extension 14 and formed with openings 26 adapted to register with the fingers 24 when the blocking ring is in one position. In other positions of the blocking ring the fingers 24 will engage solid portions thereof to prevent shifting of the collar.

Rotation of the blocking ring relative to the extension 14 is limited by a lost motion driving connection shown as comprising a block 27 secured to the extension 14 and lying within a notch or groove 28 in the face of the blocking ring. A coil spring 29 connected at one end to the blocking ring and at its other end to the extension 14 urges the blocking ring to the limit of its motion in one direction in which position the openings 26 are out of register with the fingers 24. At the other limit of motion the openings 26 register with the fingers 24 and in order to turn the blocking ring to this position, a one-way clutch 31 is connected between the blocking ring and the driving member 10.

The clutch shown is adapted to be used in a transmission of the general type more particularly described and claimed in my Patent 2,277,214 in which two parallel paths of power flow are provided. In the embodiment of Figure 1, one path is through the clutch itself and the other path is provided by a housing 32 enclosing the clutch and terminating in tubular shafts 33 around the shafts 10 and 11. The yoke 23 may be controlled by pins 34 carried by a collar 35 slidable on the housing 32 and in turn controlled through a ring 36 rotatable thereon. In a transmission of this type the driven shaft is originally driven thru the other path of power flow with the clutch disengaged until a desired speed has been reached. The torque may then be interrupted causing the driven shaft to tend to overrun the driving shaft at which time the clutch will engage to establish parallel paths of power flow thru the two paths described above.

The parts are shown in Figure 1 with the collar 16 shifted to the left to cause engagement of the clutch but with the coil 15 still out of engagement with the outer member 14. As continued rotation of the driving member occurs, the brake members 16' will hold the ring 15' to the driven member so that the coil will be unwound and expanded into driving engagement with the inner surface of the extension 14. At this time, the coil 15 will connect the extensions 12 and 14 of the driving and driven members so that torque will be transmitted from the driving member to the driven member.

If it is desired to release the clutch at any time, this can be done by shifting the collar 16 to the right to remove the engaging pressure from the brake members 16'. This removes the pressure against the left end of the coil 15 and permits it to contract against the extension 12 due to its natural bias in this direction. The coil will not contract immediately upon removal of torque from the ring 15', but will gradually unwind from its left end towards its right end, the unwinding operation being completed in a very short interval of time.

As soon as the collar 16 is shifted to the left with the driving member tending to overrun the driven member, the blocking ring 25 will be turned to blocking position by the spring 29. Any attempt at this time to shift the collar 16 into clutch engaging position, will be prevented by engagement of the fingers 24 with the solid portion of the blocking ring. In order to engage the clutch it is first necessary to reverse the torque, as for example by slowing the drive shaft so that the blocking ring will be turned to its other extreme position against the spring 29 by the one-way clutch 31. With the ring in this position, the openings 26 register with the fingers 24 so that the collar 16 can be shifted freely. It will be noted that the lost motion connection 27—28 and the one-way clutch 31 provide a driving connection between the driving and driven members to prevent overrunning of the driven member.

The clutch shown in Figures 3 and 4 is adapted to connect a shaft 41 which may be the driving member of the clutch to a tubular shaft 42 having an output gear 43 formed thereon. In this construction, the shaft 41 is formed with an enlarged portion 44 formed in its periphery with a series of notches or grooves 45 to receive clutch teeth. The grooves as shown, are formed with their sides lying at an acute angle to the radius through the groove to provide a cam angle for urging the clutch teeth to disengaged position as will be described later. The grooves are also formed on one side with a rounded shoulder 46 to provide an ejection action.

The sleeve 42 is provided opposite the enlargement 44 with a series of radial slots slidably carrying clutch blocks 47. The blocks are formed as shown, with portions 47 slidably fitting in the slots and with clutch teeth 48 on their ends having angular sides complementary to the angular sides of the notches 45. With this construction, when the shaft 41 is tending to turn counter-clockwise as seen in Figure 4, a camming action will occur between the clutch teeth and the notches tending to move the teeth out of the notches. The camming angle is preferably so chosen that its tangent slightly exceeds the coefficient of friction between the teeth, the slots in ring 42 and the notches so that the teeth will be moved out of the notches unless such movement is positively prevented.

At their outer ends the clutch blocks 47 are provided with enlarged control heads 49 having axially spaced camming surfaces 51 and 52. The heads 49 extend axially beyond the main portion of the blocks 47 to provide shoulders against which springs 53 may act to urge the blocks radially outward. As shown, the springs 53 are carried by rings 54 rotatably surrounding the shaft 41 and preferably keyed to the sleeve 42.

The clutch blocks are controlled by a collar 55 slidable on the outer sleeve 42 and having offset shoulder portions 56 and 57 to cooperate with the cam surfaces 51 and 52 respectively. The collar 55 may be moved by any suitable yoke mechanism, not shown.

In order to prevent the sleeve 42 from overrunning the shaft 41 in the forward direction, a one-way clutch 58 is provided therebetween. This clutch in addition to preventing over-running, also serves to synchronize rotation of the driving and driven members to facilitate shifting when the driven member tends to over-run the driving member.

In operation with the clutch teeth out of engagement, the collar 55 is yieldably urged to the right to the dotted position shown in Figure 3. With the parts in this position the springs 53 acting on the heads 49 of the clutch block hold the teeth 48 away from the notches 45 so that there is no connection between the shafts.

To engage the clutch, the collar 55 is urged to the left so that the shoulders 56 and 57 thereon will engage the cam surfaces 51 and 52 to move the clutch blocks radially in. If the driving shaft 41 is rotating relative to the driven sleeve at this time the ejection surfaces on the inner ends of the clutch teeth will engage the rounded shoulders 46 to prevent the clutch teeth from moving into the notches, and will also limit sliding movement of the collar toward its clutch engaging position.

When torque is removed from the driving shaft, the one-way clutch 58 will engage to synchronize rotation of the driving and driven members so that the clutch teeth can move into the notches. If rotation is synchronized with the teeth out of register with the notches, it will be apparent that the first motion of the driving member ahead of the driven member will bring them into register at such a low rate of relative rotation as to permit movement of the teeth into the notches.

With the clutch teeth engaged in the notches, the angular surfaces of the teeth and the notches exert a constant force tending to urge the teeth outwardly. When the collar is shifted to the left as seen in Figure 3, outward movement of the teeth is prevented thereby. However, when the collar is moved to the right, the teeth are allowed to move outwardly to disengage the notches so that the clutch can be disengaged at any time regardless of torque load thereon.

While two embodiments of the invention have been shown and described in detail, it will be understood that these are illustrative only and are not intended as a definition of the scope of the invention, reference being had for this purpose to the appended claims.

What is claimed is:

1. A clutch for connecting coaxial inner and outer members comprising connecting means drivably connected to one of the members and movable radially into driving engagement with the other member, control means for the connecting means including parts slidably carried by and projecting radially beyond the outer member, a control collar slidable on the outer member and engageable with said parts to move them radially inward when the collar is moved in one direction to engage the clutch, and means to prevent movement of the control collar to engage the clutch except when rotation of the members is synchronized.

2. A clutch for connecting coaxial inner and outer members comprising connecting means drivably connected to one of the members and movable radially into driving engagement with the other member, control means for the connecting means including parts slidably carried by and projecting radially beyond the outer member, a control collar slidable on the outer member and engageable with said parts to move them radially inward when the collar is moved in one direction to engage the clutch, and a one way clutch to prevent relative rotation of the members in one direction.

3. A clutch for connecting coaxial inner and outer members comprising connecting means drivably connected to one of the members and movable radially into driving engagement with the other member, control means for the connecting means including parts slidably carried by and projecting radially beyond the outer member, a control collar slidable on the outer member and engageable with said parts to move them radially inward when the collar is moved in one direction to engage the clutch, a one way clutch to prevent relative rotation of the members in one direction to synchronize the members when they tend to rotate in said direction, and means to prevent movement of the control collar to engage the clutch except when the members are synchronized.

4. A clutch for connecting coaxial inner and outer members comprising connecting means drivably connected to one of the members and movable radially into driving engagement with the other member, control means for the connecting means including parts slidably carried by and projecting radially beyond the outer member, a control collar slidable on the outer member and having a cam surface engageable with said parts to move them radially inward when the collar is moved in one direction to engage the clutch, said connecting means being biased away from said other of the members to move out of driving engagement therewith when the collar is moved in the other direction to disengage the clutch.

5. A clutch for connecting coaxial inner and outer members comprising connecting means drivably connected to one of the members and movable radially into driving engagement with the other member, control means for the connecting means including parts slidably carried by and projecting radially beyond the outer member, a control collar slidable on the outer member and engageable with said parts to move them radially inward when the collar is moved in one direction to engage the clutch, said connecting means being biased away from said other of the members to move out of driving engagement therewith when the collar is moved in the other direction to disengage the clutch, a one-way clutch connecting the members to prevent relative rotation thereof in one direction, and means to prevent movement of the collar to engage the clutch except when there is no relative rotation between the members.

6. A clutch for connecting coaxial driving and driven members comprising connecting means carried by one of the members and movable into driving engagement with the other member, means to control movement of the connecting means into said driving engagement, a control collar slidable axially of the members to operate the control means, and blocking means movable to one position when the members are rotating relatively in one direction to prevent movement of the control collar and movable to another position when the members are tending to rotate relatively in the other direction to permit movement of the control collar.

7. A clutch for connecting coaxial driving and driven members comprising connecting means carried by one of the members and movable into driving engagement with the other member, means to control movement of the connecting means into said driving engagement, a control collar slidable axially of the members to operate the control means, and blocking means movable to one position when the members are rotating relatively in one direction to prevent movement of the control collar and movable to another position when the members are tending to rotate relatively in the other direction to permit movement of the control collar, and means including a one-way clutch to limit relative rotation of the members in said other direction.

8. A clutch for connecting coaxial driving and driven members comprising connecting means carried by one of the members and movable into driving engagement with the other member, means to control movement of the connecting means into said driving engagement, a control collar slidably but non-rotatably carried by one of the members to operate the control means, a blocking ring rotatably carried by the last named member and cooperating with the control collar in one position to prevent movement thereof while permitting movement in another position, means normally urging the blocking ring to said one position, and means drivably connecting the blocking ring to the other of the members to turn the blocking ring to said other position.

9. A clutch for connecting coaxial driving and driven members comprising connecting means carried by one of the members and movable into driving engagement with the other member, means to control movement of the connecting means into said driving engagement, a control collar slidably but non-rotatably carried by one of the members to operate the control means, a blocking ring rotatably carried by the last named member and cooperating with the control collar in one position to prevent movement thereof while permitting movement in another position, means normally urging the blocking ring to said one position, and a one-way clutch connecting the blocking ring to the other of the members to turn the blocking ring to said other position.

10. A clutch for connecting coaxial driving and driven members comprising connecting means carried by one of the members and movable into driving engagement with the other member, means to control movement of the connecting means into said driving engagement, a control collar slidably but non-rotatably carried by one of the members to operate the control means and having an axially extending finger at one end, a blocking ring rotatable on the last named member and having an opening to receive the finger, means normally urging the blocking ring to a position in which the opening is out of register with the finger to prevent movement of the control collar, and means drivably connecting the blocking ring to the other of the members to turn the blocking ring to a position in which the opening registers with the finger.

11. A clutch for connecting inner and outer coaxial members comprising a helical coil carried by and drivably connected at one end to one of the members, a radially movable brake shoe carried by the other member for connecting the other end of the coil thereto, a control collar slidable on the other member having an inner cam surface engageable with the brake shoe to move it radially inward into engaged position, and means to prevent movement of the control collar except when rotation of the members is synchronized.

12. A clutch for connecting inner and outer coaxial members comprising a helical coil carried by and drivably connected at one end to one of the members, a radially movable brake shoe carried by the other member for connecting the other end of the coil thereto, a control collar slidable on the other member having an inner cam surface engageable with the brake shoe to move it radially inward into engaged position, an axially extending finger on the control collar, a blocking ring rotatable on the other member and having an opening registering with the finger in one position of the ring, a spring acting between the blocking ring and the other member to turn the ring to a position in which the opening is out of register with the finger, means limiting relative rotation between the blocking ring and the other member, and means forming a driving connection between said one member and the ring to turn the ring to its said one position.

13. A clutch for connecting inner and outer coaxial members comprising a helical coil carried by and drivably connected at one end to one of the members, a radially movable brake shoe carried by the other member for connecting the other end of the coil thereto, a control collar slidable on the other member having an inner cam surface engageable with the brake shoe to move it radially inward into engaged position, an axially extending finger on the control collar, a blocking ring rotatable on the other member and having an opening registering with the finger in one position of the ring, a spring acting between the blocking ring and the other member to turn the ring to a position in which the opening is out of register with the finger, means limiting relative rotation between the blocking ring and the other member, and a one-way clutch between the ring and said one member to form a driving connection therebetween in one direction.

14. A clutch for connecting inner and outer coaxial members comprising a helical coil carried by and drivably connected at one end to the inner member, a ring rotatable on the inner member and drivably connected to the other end of the coil, brake means carried by the outer member and engageable with the ring to cause the coil to expand into driving engagement with the outer member, the coil being biased toward the inner member so that it will move away from the outer member when the brake means is disengaged.

15. A clutch for connecting inner and outer coaxial members comprising a helical coil carried by and drivably connected at one end to the inner member, a ring rotatable on the inner member and drivably connected to the other end of the coil, brake means carried by the outer member and engageable with the ring to cause the coil to expand into driving engagement with the outer member, the coil being biased toward the inner member so that it will move away from the outer member when the brake means is disengaged, means forming a one-way lost motion driving connection between the inner and outer members, and control means controlled by the lost motion means to prevent actuation of the brake means except when the one-way means is in operation.

16. A clutch for connecting inner and outer coaxial members comprising a clutch block slidably carried by the outer member for radial sliding movement, a tooth on the clutch block having a driving surface at an angle to a radius therethrough to create a cam angle urging the clutch tooth to disengaged position, the inner member having a notch therein formed with a driving surface complementary to the tooth driving surface, a control head on the clutch block, and control means cooperating with the head to move the block to clutch engaging position.

17. A clutch for connecting inner and outer coaxial members comprising a clutch block slidably carried by the outer member for radial sliding movement, a tooth on the clutch block having a driving surface at an angle to a radius therethrough to create a cam angle urging the clutch tooth to disengaged position, the inner member having a notch therein formed with a driving surface complementary to the tooth driving surface, the clutch tooth being formed on its end with an angular ejection surface and the inner member having a rounded shoulder cooperating with the ejection surface to prevent entry of the tooth into the notch when the inner and outer members are rotating relatively, a control head on the block projecting radially beyond the outer member, and a control collar slidable on the outer member and engageable with the head to move the block inwardly, the ejection surface and shoulder preventing movement of the control collar when the members are rotating relatively.

18. A clutch for connecting inner and outer coaxial members comprising a clutch block slidably carried by the outer member for radial sliding movement, a tooth on the clutch block having a driving surface at an angle to a radius therethrough to create a cam angle urging the clutch tooth to disengaged position, the inner member having a notch therein formed with a driving surface complementary to the tooth driving surface, the clutch tooth being formed on its end with an angular ejection surface and the inner member having a rounded shoulder cooperating with the ejection surface to prevent entry of the tooth into the notch when the inner and outer members are rotating relatively, a control head on the block projecting radially beyond the outer member, and a control collar slidable on the outer member and engageable with the head to move the block inwardly, the ejection surface and shoulder preventing movement of the control collar when the members are rotating relatively, and a one-way clutch acting between the members to prevent relative rotation thereof in one direction thereby to synchronize their rotation.

ADIEL Y. DODGE.